US012510108B1

(12) United States Patent
Liang et al.

(10) Patent No.: US 12,510,108 B1
(45) Date of Patent: Dec. 30, 2025

(54) BIDIRECTIONAL HYDRAULIC HYBRID POWER SYSTEM CONTAINING AN EXTERNALLY CONNECTED BIDIRECTIONAL MANUAL PUMP SYSTEM

(71) Applicant: Amtai Medical Equipment, Inc., Raleigh, NC (US)

(72) Inventors: Clay Liang, Raleigh, NC (US); Chien-Cheng Su, New Taipei (TW)

(73) Assignee: AMTAI MEDICAL EQUIPMENT, INC., NC (US)

( * ) Notice: Subject to any disclaimer, the term of this patent is extended or adjusted under 35 U.S.C. 154(b) by 0 days.

(21) Appl. No.: 18/810,550

(22) Filed: Aug. 21, 2024

(51) Int. Cl.
*F15B 11/17* (2006.01)
*F04B 23/02* (2006.01)
*F04B 23/08* (2006.01)
*F04B 49/22* (2006.01)

(52) U.S. Cl.
CPC .............. *F15B 11/17* (2013.01); *F04B 23/02* (2013.01); *F04B 23/08* (2013.01); *F04B 49/22* (2013.01)

(58) Field of Classification Search
CPC .................... F15B 11/17; F15B 20/004; F15B 2211/8633; F15B 2211/895; F04B 23/02; F04B 23/08
See application file for complete search history.

(56) References Cited

U.S. PATENT DOCUMENTS 5,335,926 A * 8/1994 Stolle ...................... F15B 13/10 296/117
9,366,242 B2 * 6/2016 Liang .................... F16K 11/044

* cited by examiner

*Primary Examiner* — Michael Leslie
(74) *Attorney, Agent, or Firm* — Leong C. Lei

(57) ABSTRACT

A bidirectional hydraulic hybrid power system containing an externally connected bidirectional manual pump enables easy upgrading from an electrically driven system to a hybrid system driven by either electrical or manual power. It comprises an oil reservoir, a bidirectional pump, a motor, an oil circuit block including a two-pressure valve within it, a first oil tube, a second oil tube, an external bidirectional manual pump system. After removing or rerouting the first and second oil tubes, an external bidirectional manual pump system can easily connect to the oil circuit block, thus making it a hybrid system driven by either electrical or manual power. The bidirectional manual pump system includes a manual switching valve that fully isolates it from the bidirectional pump. Such isolation prevents the system's output pressure and oil supply from instability due to unwanted leaking of pressurized oil, which makes operation easy and efficient.

11 Claims, 8 Drawing Sheets

BIDIRECTIONAL HYDRAULIC HYBRID POWER SYSTEM CONTAINING AN EXTERNALLY CONNECTED BIDIRECTIONAL MANUAL PUMP SYSTEM

BACKGROUND OF THE INVENTION

(a) Technical Field of the Invention

The present invention relates to a bidirectional hydraulic hybrid power system containing an externally connected bidirectional manual pump system, particularly one that enables easy upgrading from an electrically driven system to a hybrid system driven by either electrical or manual power. By externally connecting the bidirectional manual pump system, the electrohydraulic power system is ready for upgrading to a hybrid-driven system, making the upgrade economical and convenient. The electrical and manual hydraulic power systems share some of the same components to save costs further. A manual switching valve can fully isolate the two electrically or manually driven hydraulic power systems, preventing the system's output pressure and oil supply from instability due to unwanted leaking of pressurized oil.

(b) Description of the Prior Art

In this technical field, the Applicant has previously filed and granted a patent, U.S. Pat. No. 9,366,242B2, BIDIRECTIONAL OUTPUT MIXED HYDRAULIC POWER SYSTEM. The claims of this patent include an oil reservoir that stores hydraulic fluid; at least one electrical hydraulic (motor) pump connected to the oil reservoir and operable to draw in, pressurize, and output the hydraulic fluid; at least one mechanical (manual) pump connected to the oil reservoir and operable to draw in, pressurize, and output the hydraulic fluid; at least two sequence check valves (shuttle valves) respectively connected to the motor pump and the manual pump, each sequence check valve being ordinarily open in a first direction, and the flow stopped in a second direction; and a two-pressure valve connected to the oil reservoir and each of the sequence check valves for changing the output direction of the pressurized hydraulic fluid.

The above patent intends to set the sequence check valves to ordinarily open in the motor pump's output direction and close in the manual pump's output direction without causing pressure accumulation when no pump is activated, allowing the motor pump to output pressure when activated; when the manual pump is activated, its output pressure pushes the sequence check valve to close the passage of hydraulic oil to the motor pump making the manual pump the pressure source. Therefore, the sequence check valves isolate the two pressure sources to achieve a hybrid bidirectional hydraulic power system.

In practical applications, for example, when used as a power source for the tabletop movements of a surgical table, the above patent has the following shortcomings.

(1) The first disadvantage is unstable pressure output. The hydraulic output from the manual pump must be higher than a certain level to push the sequence check valve and close the motor pump's output passage. Therefore, when operating the manual pump, insufficient pumping speed or force will prevent the sequential check valve (shuttle valve) from closing the oil passage to the motor pump, causing the hydraulic oil to flow back to the oil reservoir, which results in unstable pressure output. This kind of unstable pressure output is a quality problem that is unacceptable to users.

(2) The second disadvantage is that it is uneconomical. A purely electric hydraulic power unit does not require a sequential check valve (shuttle valve) and can't be coupled with a manual pump to be a hybrid system. This way, when upgrading a purely electric hydraulic power unit to a hybrid one, the customer must pay extra to replace it with a hydraulic power unit equipped with sequential check valves (shuttle valves). In addition to the additional cost of upgrading, the manufacturer suffers from a higher inventory of different types of hydraulic power units.

SUMMARY OF THE INVENTION

The primary purpose of the present invention is to provide a bidirectional hydraulic hybrid power system containing an externally connected bidirectional manual pump system. Its driving modes can be easily switched between electric and manual while maintaining the complete isolation of oil passages between the two driving modes to output stable hydraulic pressure. Another purpose of the present invention is to save costs. The design of the bidirectional hydraulic hybrid power system is an upgrade of a bidirectional electro-hydraulic power system by externally connecting the bidirectional manual pump system to reduce costs in materials and inventory.

To achieve the above objective, the present invention provides an improvement with respect to a bidirectional hydraulic hybrid power system containing an externally connected bidirectional manual pump system, which comprises: an oil reservoir that stores hydraulic oil; a bidirectional pump drawing hydraulic oil from the oil reservoir, which outputs pressurized oil through one of its two output channels according to the pump's rotating directions; a motor that drives the bidirectional pump to rotate clockwise or counterclockwise; a two-pressure valve having two ports, wherein it closes oil return channel between the oil reservoir and the port pushed by pressurized oil meanwhile opens the oil return channel between the oil reservoir and the other port; an oil circuit block having the above mentioned two-pressure valve integrated within it and connecting the oil reservoir, the bidirectional pump, and the motor, wherein a first motor pump external port and a second motor pump external port are connected respectively to the bidirectional pump's two output channels; a first oil tube that connects between the first motor pump external port and the first two-pressure valve port; and a second oil tube that connects between the second motor pump external port and the second two-pressure valve port; an external bidirectional manual pump can be connected to the above said bidirectional electro-hydraulic power system, when necessary, through the two motor pump external ports and the two two-pressure valve ports connected to a bidirectional manual pump system, by replacing or rerouting the first and the second oil tubes, wherein the bidirectional manual pump system comprises a manual pump, a manual switching valve, a manual-pump oil circuit coupled between the manual pump and manual switching valve, an oil inlet tube, a first oil outlet tube, and a second oil outlet, in which the bidirectional manual pump system draws hydraulic oil from the oil reservoir through the oil inlet tube and outputs pressurized oil through one of its two oil outlet tubes that is selected by the manual switching valve to one of the two two-pressure valve ports.

In one embodiment of the present invention, the oil circuit block further comprises two pressure relief valves, each with an inlet connected to one of the two-pressure valve ports and an outlet connected to the oil reservoir.

In one embodiment of the present invention, the oil circuit block further comprises an external oil returning port connected to the oil reservoir, which drains the leaking low-pressure oil from the external hydraulic system to the oil reservoir.

In one embodiment of the present invention, the manual switching valve comprises a manual selector for selecting one of the three valve positions, the first, second, and third ones.

In one embodiment of the present invention, the first valve position of the manual switching valve opens the passage for the output of the pressurized oil from the bidirectional manual pump system to the first two-pressure valve port; the second valve position of the manual switching valve opens the passage for the output of the pressurized oil from the bidirectional manual pump system to the second two-pressure valve port; the third valve position of the manual switching valve opens the passage from the first motor pump external port to the first two-pressure valve port and the passage from the second motor pump external port to the second two-pressure valve port.

In one embodiment of the present invention, the manual pump and the manual switching valve are integrated into one structural piece.

In one embodiment of the present invention, the manual pump and the manual switching valve are separate structural pieces.

DETAILED DESCRIPTION OF THE PREFERRED EMBODIMENTS

Figure 1:
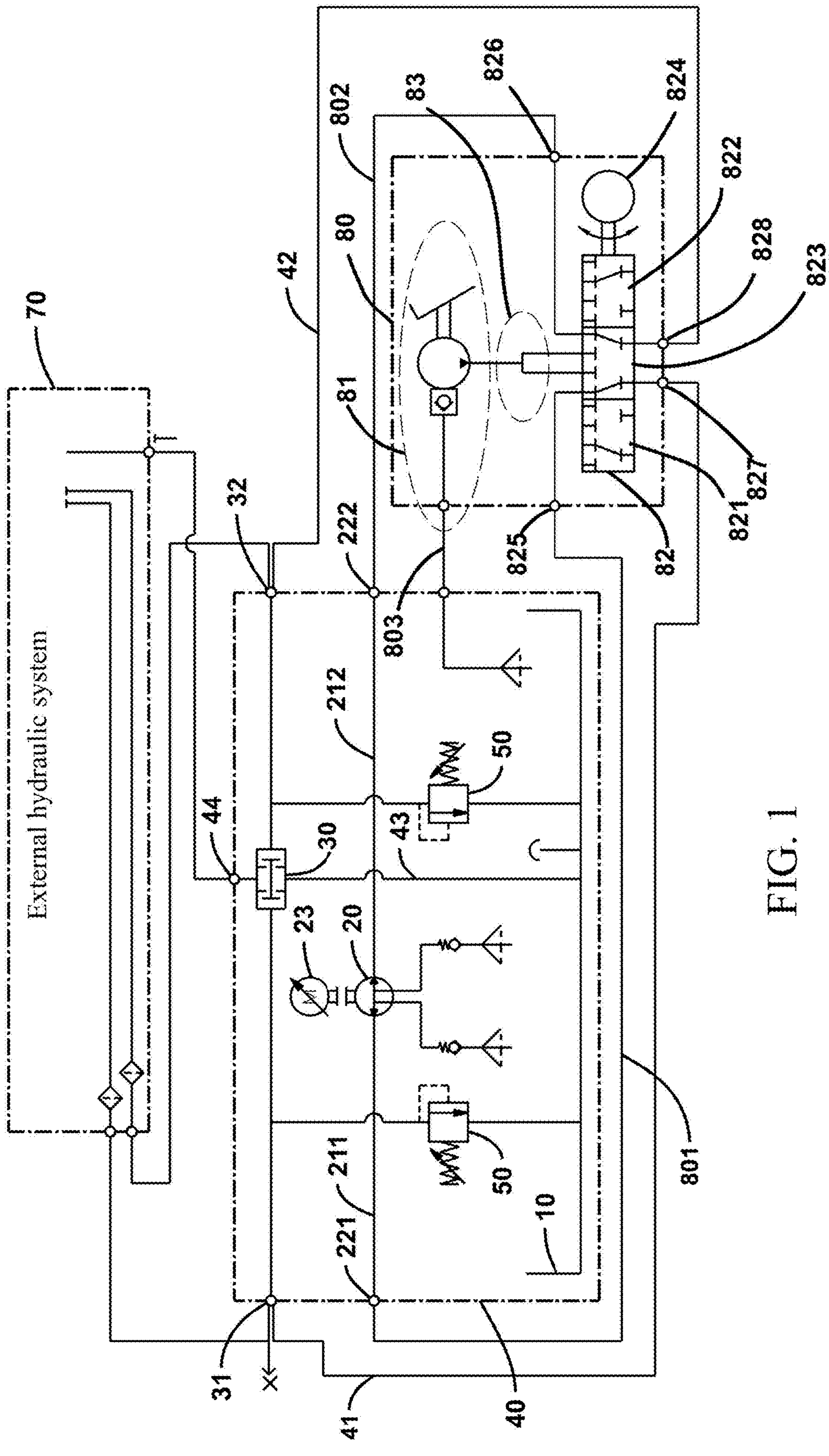
FIG. 1 is a schematic diagram of the oil circuit of the present invention that includes the bidirectional manual pump system when it is not in operation.

Refer to FIG. 1 to FIG. 8 to understand the following description. As illustrated in these drawings, the present invention discloses a bidirectional hydraulic hybrid power system containing an externally connected bidirectional manual pump system 80, comprising an oil reservoir 10, a bidirectional pump 20, a motor 23, a two-pressure valve 30, an oil circuit block 40, a first oil tube 41, and a second oil tube 42.

The oil reservoir 10 stores hydraulic oil therein.

The bidirectional pump 20 draws hydraulic oil from the oil reservoir 10 and outputs pressurized oil through one of its two output channels, 211 and 212, according to the pump's rotating directions.

The motor 23 drives the bidirectional pump to rotate either clockwise or counterclockwise.

The two-pressure valve 30 has two ports, 31 and 32. It closes the oil return channel 43 between the oil reservoir 10 and the port pushed by pressurized oil while simultaneously opening the oil return channel 43 between the oil reservoir 10 and the other port.

The oil circuit block 40 integrates the two-pressure valve 30 mentioned above within it. It connects the oil reservoir 10, the bidirectional pump 20, and the motor 23 so that the first motor pump external port 221 and the second motor pump external port 222 are connected to the bidirectional pump's two output channels, 211 and 212, respectively.

Figure 6:
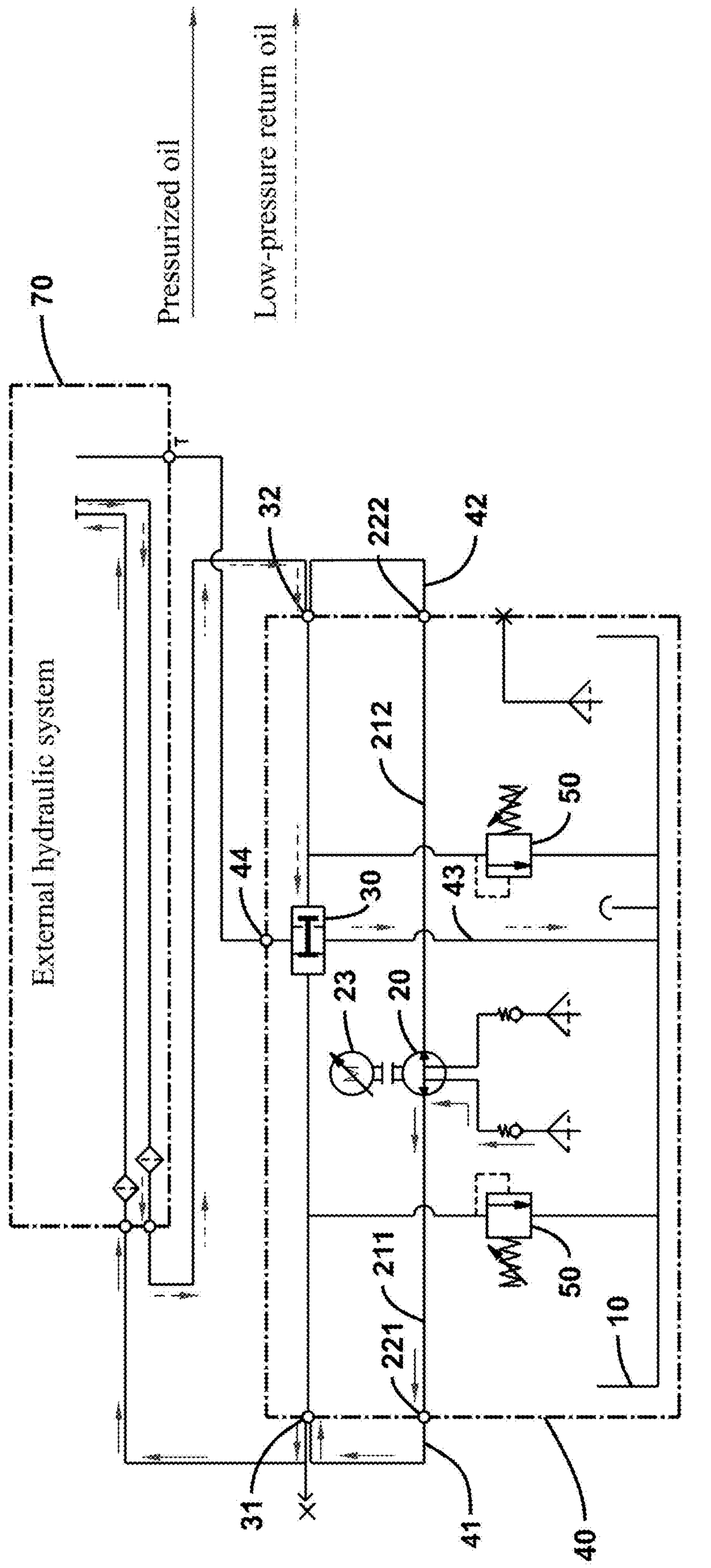
FIG. 6 is a schematic diagram of the oil circuit of the present invention without an external bidirectional manual pump system when the first motor pump external port supplies pressurized oil to an external hydraulic system.
Figure 7:
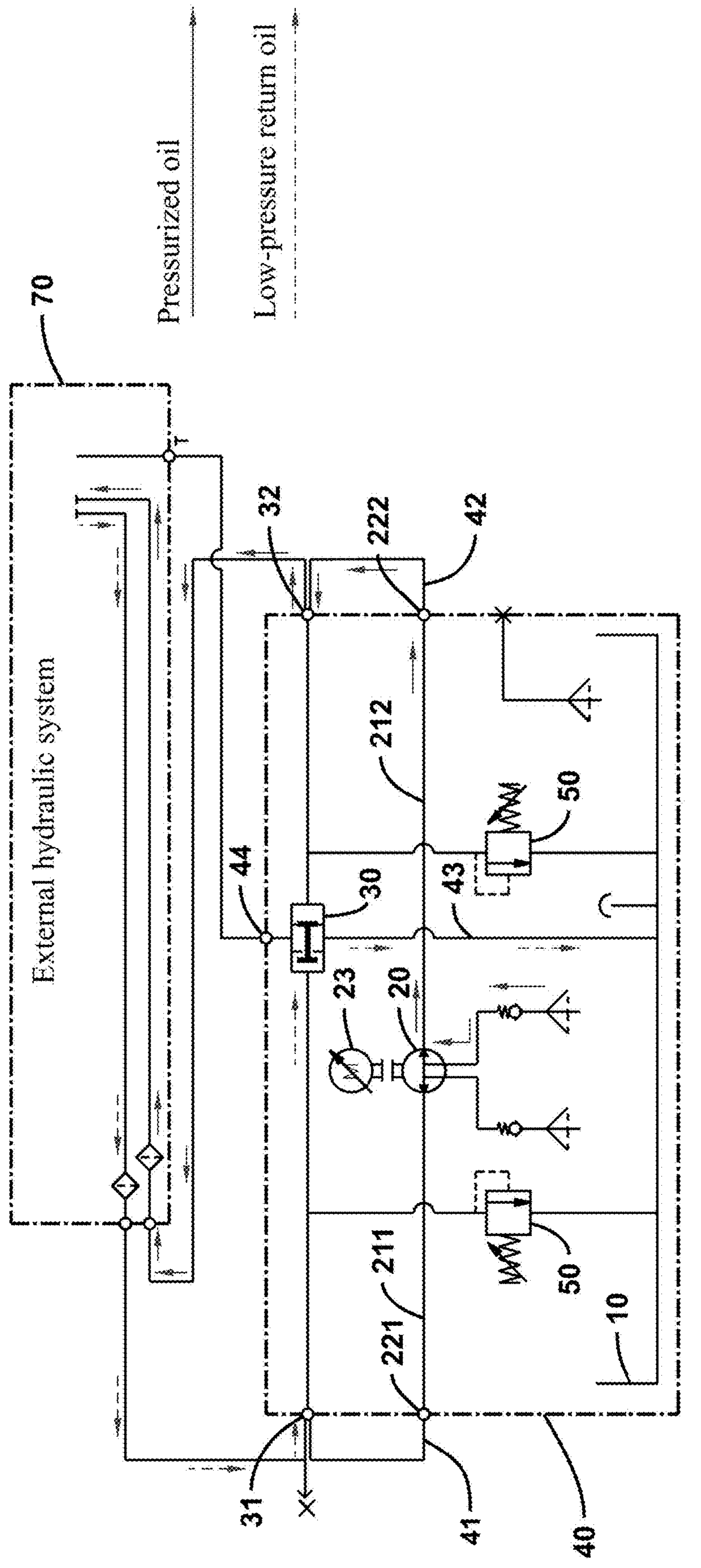
FIG. 7 is a schematic diagram of the oil circuit of the present invention without an external bidirectional manual pump system when the second motor pump external port supplies pressurized oil to an external hydraulic system.

As shown in FIG. 6 and FIG. 7, when there is no external bidirectional manual pump system, the first oil tube 41 connects the first motor pump external port 221 and the first two-pressure valve port 31, and the second oil tube 42 connects the second motor pump external port 222 and the second two-pressure valve port 32. When the bidirectional pump 20 supplies pressurized oil through the first two-pressure valve port 31 to an external hydraulic system 70, the second two-pressure valve port 32 serves as a passage for oil return from the external hydraulic system 70. Conversely, when the bidirectional pump 20 supplies pressurized oil through the second two-pressure valve port 32 to an external hydraulic system 70, the first two-pressure valve port 31 serves as a passage for oil return from the external hydraulic system 70.

Figure 8:
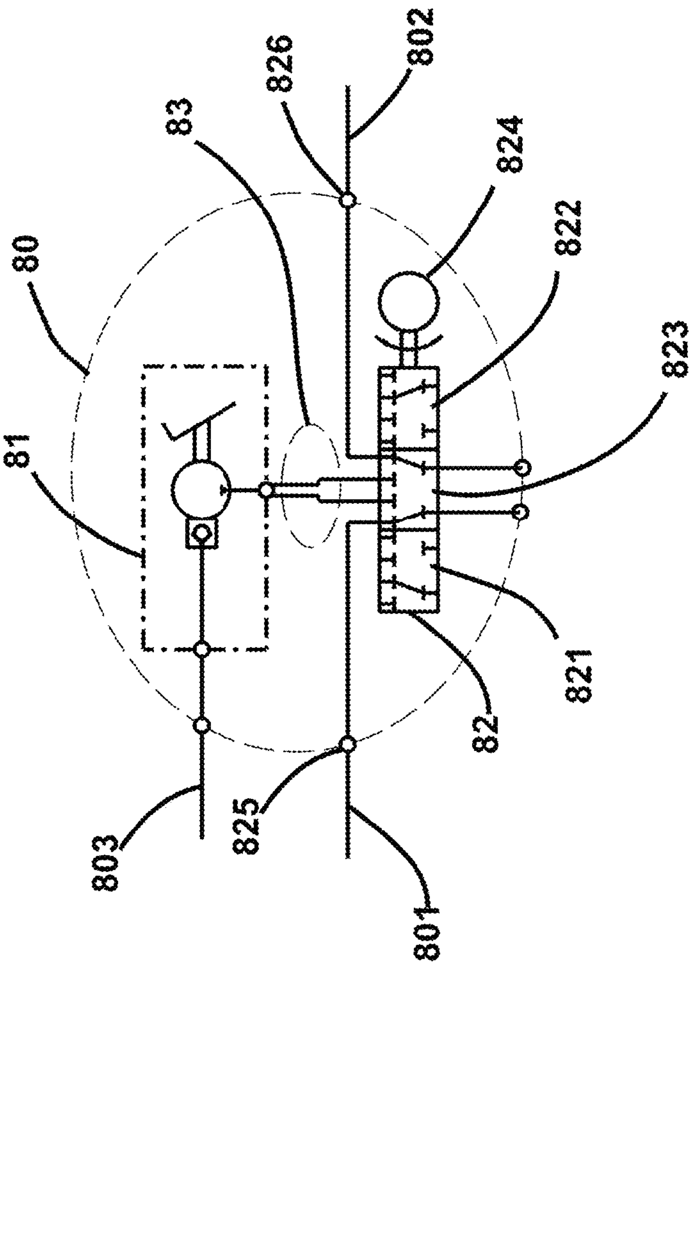
FIG. 8 is a schematic diagram of the oil circuit of the present invention's external bidirectional manual pump system, wherein the manual pump and the manual switching valve are separate structural pieces.

As shown in FIG. 1, when necessary, an external bidirectional manual pump system 80 can be connected to the above said bidirectional electro-hydraulic power system through the two motor pump external ports, 221 and 222, and the two two-pressure valve ports, 31 and, 32, by replacing or rerouting the first oil tube 41 and the second oil tube 42. As shown in FIG. 8, the bidirectional manual pump system 80 comprises a manual pump 81, a manual switching valve 82, a manual-pump oil circuit 83 coupled between the manual pump 81 and manual switching valve 82, an oil inlet tube 803, a first oil outlet tube 801, and a second oil outlet 802.

The connection between the bidirectional electro-hydraulic power system and the external bidirectional manual pump system 80 is shown in FIG. 1 and described as follows. The motor pump external port 221 is connected to the input port 825 through the first oil outlet tube 801, and the motor pump external port 222 is connected to the input port 826 through the second oil outlet tube 802. The two-pressure valve port 31 is connected to the output port 827 through the rerouted or replaced the first oil tube 41, and the two-pressure valve port 32 is connected to the output port 828 through the rerouted or replaced the second oil tube 42. The oil inlet tube 803 is connected to the oil reservoir 10 through the passage of the oil circuit block 40.

Figure 4:
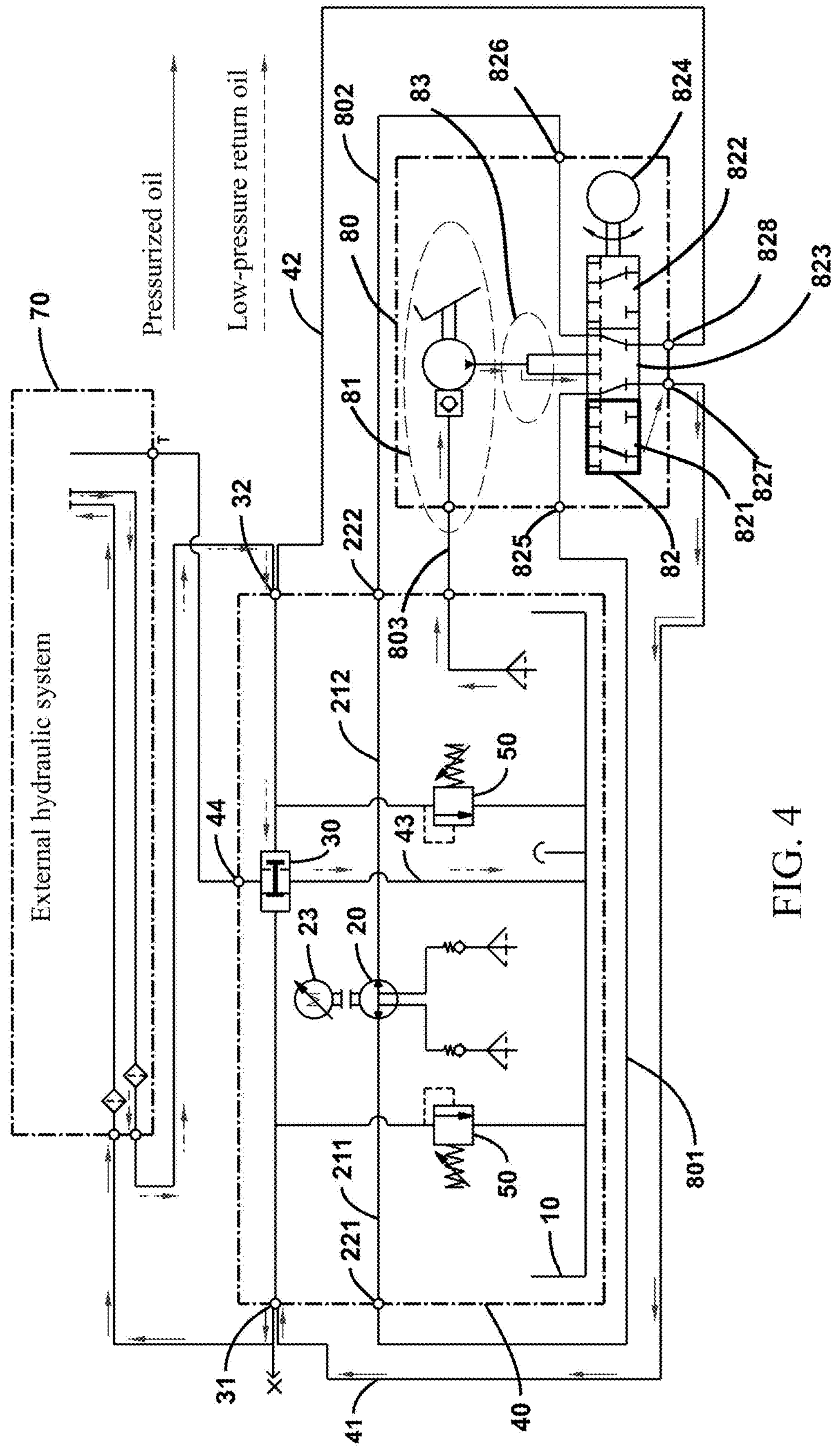
FIG. 4 is a schematic diagram of the oil circuit of the present invention that includes the bidirectional manual pump system when the manual pump supplies pressurized oil to an external hydraulic system through the first two-pressure valve port.
Figure 5:
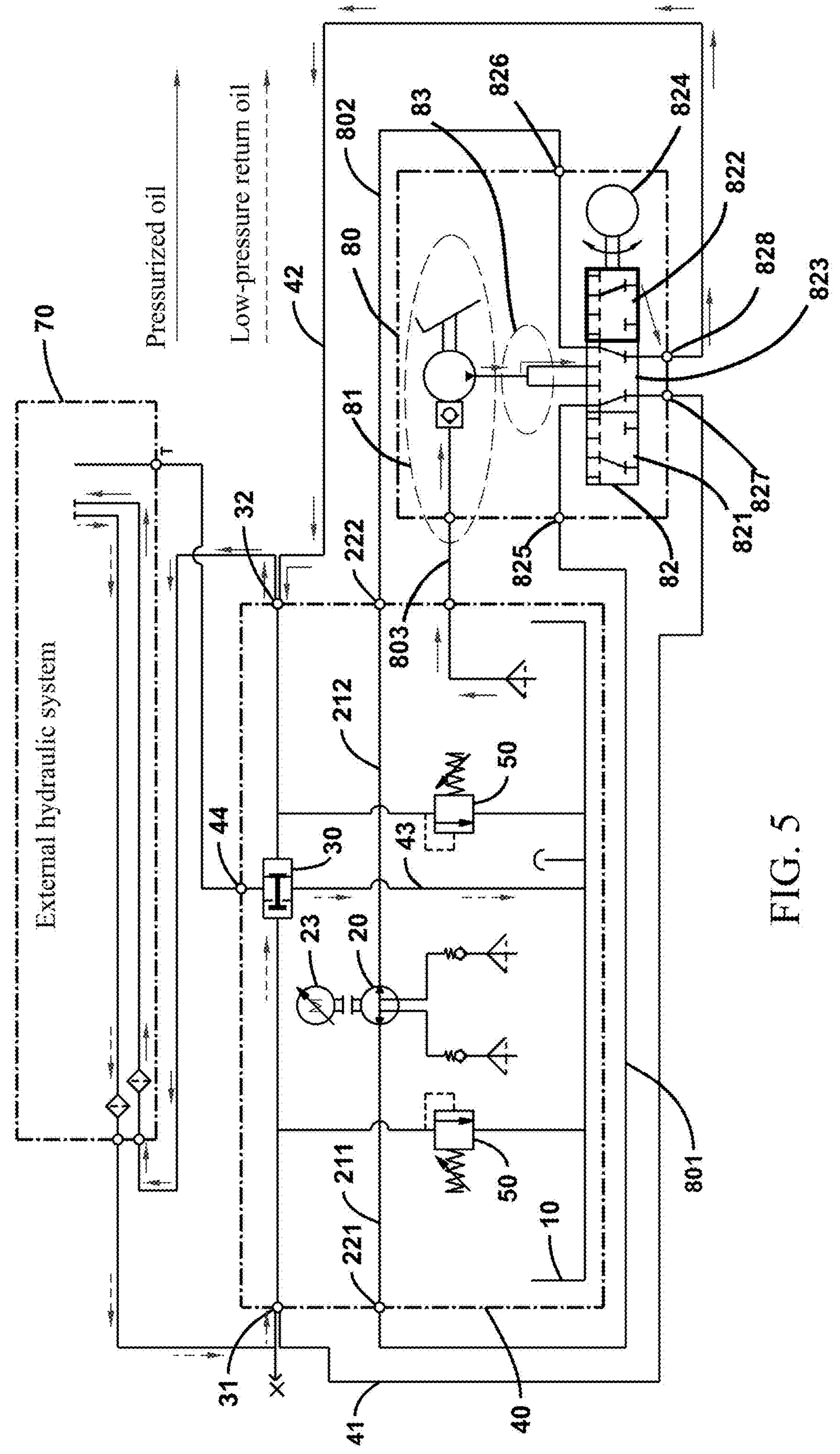
FIG. 5 is a schematic diagram of the oil circuit of the present invention that includes the bidirectional manual pump system when the manual pump supplies pressurized oil to an external hydraulic system through the second two-pressure valve port.

As shown in FIG. 4 and FIG. 5, the bidirectional manual pump system 80 can draw hydraulic oil from the oil reservoir 10 and outputs pressurized oil through one of the two output ports, 827 and 828, selected by the manual switching valve 824.

From the above description, it can be known that the present invention provides hydraulic power from the two-pressure valve port, either 31 or 32, to an external hydraulic system regardless of whether the power source is the bidirectional pump 20 or the bidirectional manual pump system 80.

In one embodiment of the present invention, the oil circuit block 40 comprises two pressure relief valves 50, each with an inlet connected to one of the two-pressure valve ports, 31 and 32, and an outlet connected to the oil reservoir 10.

In one embodiment of the present invention, the oil circuit block 40 comprises an external oil returning port 44 connected to the oil reservoir 10, which drains the leaking low-pressure oil from the external hydraulic system 70 to the oil reservoir 10.

In one embodiment of the present invention, the manual switching valve 82 comprises a manual selector 824 for selecting one of the first valve position 821, the second valve position 822, and the third valve position 823.

In one embodiment of the present invention, in the manual switching valve 82, the first valve position 821 opens the passage for the output of the pressurized oil from the bidirectional manual pump system 80 to the first two-pressure valve port 31; the second valve position 822 opens the passage for the output of the pressurized oil from the bidirectional manual pump system 80 to the second two-pressure valve port 32; the third valve position 823 opens the passage from the first motor pump external port 221 to the first two-pressure valve port 31 and the passage from the second motor pump external port 222 to the second two-pressure valve port 32.

In one embodiment of the present invention, the manual pump 81 and the manual switching valve 82 are integrated into one structural piece (see FIG. 1).

In one embodiment of the present invention, the manual pump 81 and the manual switching valve 82 are separate structural pieces (see FIG. 8).

The above description explains each component of the present invention and its composition. Subsequently, the following description illustrates the present invention's implementation examples, features, and advantages.

The present invention, a bidirectional hydraulic hybrid power system containing an externally connected bidirectional manual pump system, enables easy upgrading from an electrically driven system to a hybrid system driven by either electrical or manual power, in which the manual switching valve 82 can fully isolate the two electrically or manually driven hydraulic power systems, preventing the system's output pressure and oil supply from instability due to unwanted leaking of pressurized oil.

By externally connecting the bidirectional manual pump system 80, the electrohydraulic power system is ready for upgrading to a hybrid-driven system, making the upgrade economical and convenient. The electrical and manual hydraulic power systems share some of the same components to reduce costs in materials and inventory.

FIG. 1 is a schematic diagram of the oil circuit of the present invention that includes the bidirectional manual pump system 80 when it is not in operation. One embodiment of the present invention, illustrated in FIG. 1, is that the manual pump 81 and the manual switching valve 82 are integrated into one structural piece, coupled by a manual pump oil circuit 83 in between.

Figure 2:
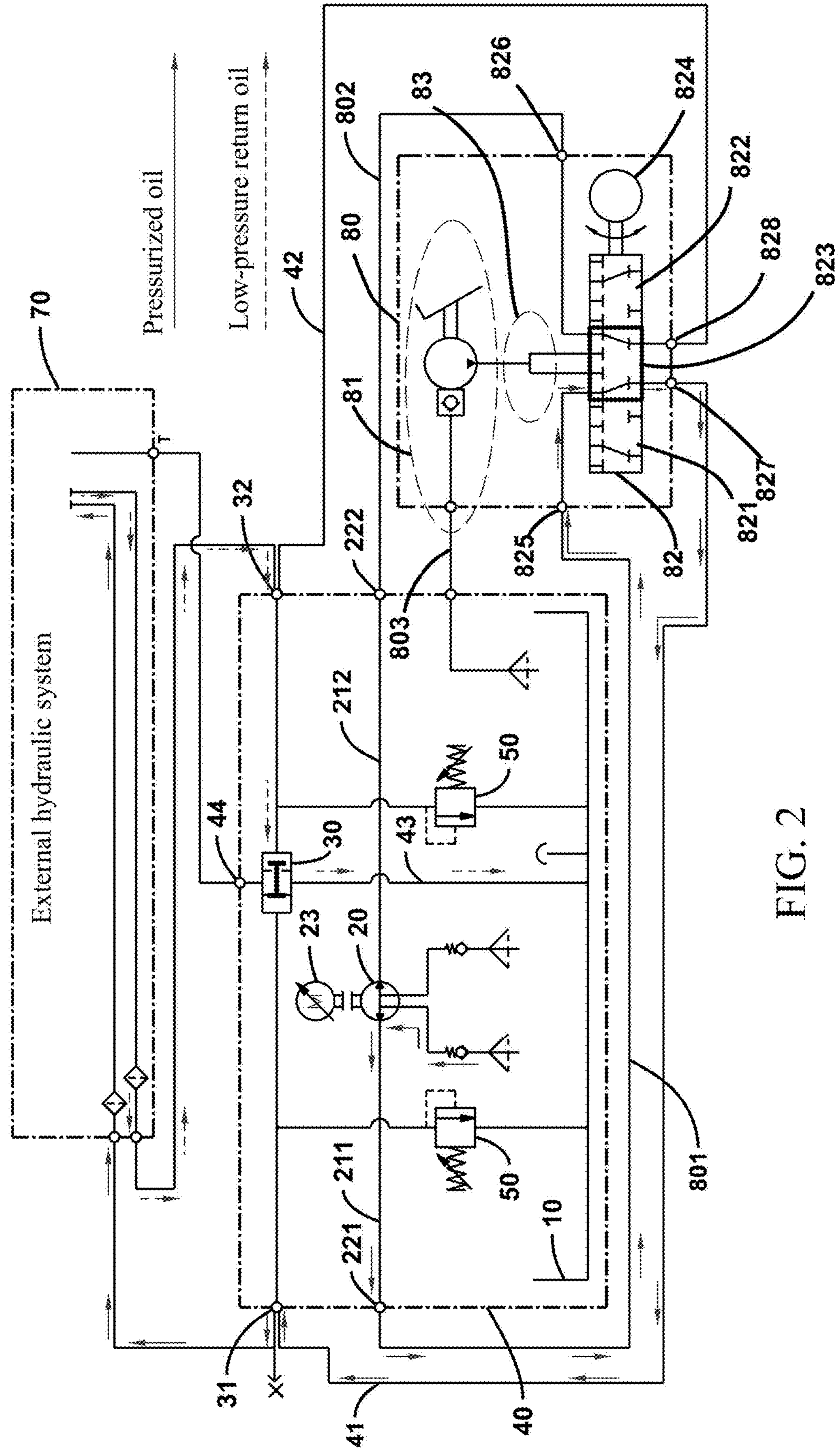
FIG. 2 is a schematic diagram of the oil circuit of the present invention that includes the bidirectional manual pump system when the first motor pump external port supplies pressurized oil to an external hydraulic system.

FIG. 2 is the schematic diagram of the oil circuit of the present invention that includes the bidirectional manual pump system 80 when the first motor pump external port 221 supplies pressurized oil to an external hydraulic system 70. As illustrated in FIG. 2, the manual switching valve 82 is set to the third valve position 823 to open the passage from the first motor pump external port 221 to the first two-pressure valve port 31 and the passage from the second motor pump external port 222 to the second two-pressure valve port 32. Consequently, when the bidirectional pump 20 outputs pressurized hydraulic oil from the first motor pump external port 221 to the first two-pressure valve port 31, the present invention provides hydraulic power to an external hydraulic system 70. Meanwhile, the low-pressure return oil from the external hydraulic system 70 flows back to reservoir 10 through the second two-pressure valve port 32. Such a function causes the external hydraulic system 70 to drive a movement, such as pushing out the cylinder rod of a bi-directional hydraulic cylinder.

Figure 3:
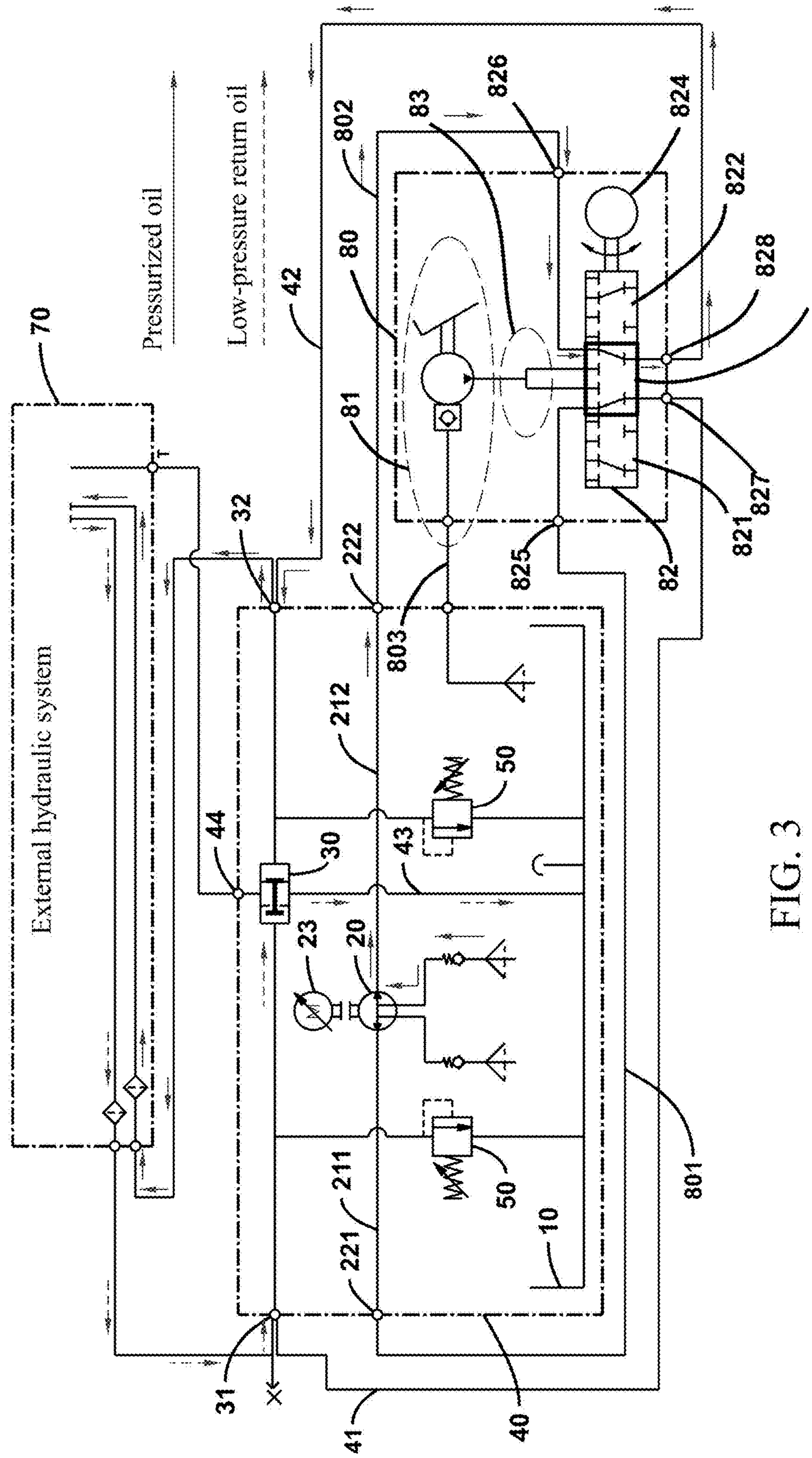
FIG. 3 is a schematic diagram of the oil circuit of the present invention that includes the bidirectional manual pump system when the second motor pump external port supplies pressurized oil to an external hydraulic system.

FIG. 3 is the schematic diagram of the oil circuit of the present invention that includes the bidirectional manual pump system when the second motor pump external port 222 supplies pressurized oil to an external hydraulic system 70. As illustrated in FIG. 3, the manual switching valve 82 is set to the third valve position 823 to open the passage from the first motor pump external port 221 to the first two-pressure valve port 31 and the passage from the second motor pump external port 222 to the second two-pressure valve port 32. Consequently, when the bidirectional pump 20 outputs pressurized hydraulic oil from the second motor pump external port 222 to the second two-pressure valve port 32, the present invention provides hydraulic power to an external hydraulic system 70. Meanwhile, the low-pressure return oil from the external hydraulic system 70 flows back to reservoir 10 through the first two-pressure valve port 31. Such a function causes the external hydraulic system 70 to drive the reverse movement described in the previous paragraph, such as pulling back a bi-directional hydraulic cylinder rod.

FIG. 4 is the schematic diagram of the oil circuit of the present invention that includes the bidirectional manual pump system when the manual pump supplies pressurized oil to an external hydraulic system 70 through the first two-pressure valve port 31. As illustrated in FIG. 4, the manual switching valve 82 is set to the first valve position 821 to open the passage for the pressurized oil output from the bidirectional manual pump system 80 to the first two-pressure valve port 31. Thus, the bidirectional manual pump system 80 outputs pressurized hydraulic oil to the first two-pressure valve port 31, providing hydraulic power to an external hydraulic system 70. Meanwhile, the low-pressure return oil from the external hydraulic system 70 flows back to reservoir 10 through the second two-pressure valve port 32. Such a function causes the external hydraulic system 70 to drive a movement, such as pushing out the cylinder rod of a bi-directional hydraulic cylinder.

FIG. 5 is the schematic diagram of the oil circuit of the present invention that includes the bidirectional manual pump system when the manual pump supplies pressurized oil to an external hydraulic system 70 through the second two-pressure valve port 32. As illustrated in FIG. 5, the manual switching valve 82 is set to the second valve position 822 to open the passage for the pressurized oil output from the bidirectional manual pump system 80 to the second two-pressure valve port 32. Thus, the bidirectional manual pump system 80 outputs pressurized hydraulic oil to the second two-pressure valve port 32, providing hydraulic power to an external hydraulic system 70. Meanwhile, the low-pressure return oil from the external hydraulic system 70 flows back to reservoir 10 through the first two-pressure valve port 31. Such a function causes the external hydraulic system 70 to drive the reverse movement described in the previous paragraph, such as pulling back a bi-directional hydraulic cylinder rod.

As illustrated in FIG. 4 and FIG. 5, the manual switching valve 82 fully isolates the bidirectional pump 20 from the manual pump 81, preventing the system's output pressure and oil supply from instability due to unwanted leaking of pressurized oil. Thus, the operator can easily pedal the manual pump 81 to output hydraulic power efficiently.

FIG. 6 is the schematic diagram of the oil circuit of the present invention without an external bidirectional manual pump system when the first motor pump external port 221 supplies pressurized oil to an external hydraulic system 70. As illustrated in FIG. 6, the first oil tube 41 serves as the passage from the first motor pump external port 221 to the first two-pressure valve port 31, and the second oil tube 42 serves as the passage from the second motor pump external port 222 to the second two-pressure valve port 32. Consequently, when the bidirectional pump 20 outputs pressurized hydraulic oil from the first motor pump external port 221 to the first two-pressure valve port 31, the present invention provides hydraulic power to an external hydraulic system 70. Meanwhile, the low-pressure return oil from the external hydraulic system 70 flows back to reservoir 10 through the second two-pressure valve port 32. Such a function causes the external hydraulic system 70 to drive a movement, such as pushing out the cylinder rod of a bi-directional hydraulic cylinder.

FIG. 7 is the schematic diagram of the oil circuit of the present invention without an external bidirectional manual pump system when the second motor pump external port 222 supplies pressurized oil to an external hydraulic system 70. As illustrated in FIG. 7, the first oil tube 41 serves as the passage from the first motor pump external port 221 to the first two-pressure valve port 31, and the second oil tube 42 serves as the passage from the second motor pump external port 222 to the second two-pressure valve port 32. Consequently, when the bidirectional pump 20 outputs pressurized hydraulic oil from the second motor pump external port 222 to the second two-pressure valve port 32, the present invention provides hydraulic power to an external hydraulic system 70. Meanwhile, the low-pressure return oil from the external hydraulic system 70 flows back to reservoir 10 through the first two-pressure valve port 31. Such a function causes the external hydraulic system 70 to drive the reverse movement described in the previous paragraph, such as pulling back a bi-directional hydraulic cylinder rod.

FIG. 2 and FIG. 3 illustrate, as a set of schematic diagrams, how the present invention, equipped with the bidirectional manual pump system 80, supplies bidirectional pressurized oil to an external hydraulic system 70. Correspondingly, FIG. 6 and FIG. 7 illustrate, as a set of schematic diagrams, how the present invention, without an external bidirectional manual pump system, supplies bidirectional pressurized oil to an external hydraulic system 70. The external manual pump system 80 added to the sets of schematic diagrams, FIG. 6 and FIG. 7, becomes FIG. 2 and FIG. 3. Therefore, by externally connecting the bidirectional manual pump system 80, the electrohydraulic power system is ready for upgrading to a hybrid-driven system, making the upgrade economical and convenient. Furthermore, the electrical and manual hydraulic power systems share some of the same components to reduce costs in materials and inventory.

FIG. 8 is a schematic diagram of the oil circuit of the present invention's external bidirectional manual pump system, wherein the manual pump and the manual switching valve are separate structural pieces. One embodiment of the present invention, as illustrated in FIG. 8, is that the manual pump 81 and the manual switching valve 82 are separate components coupled by a manual pump oil circuit 83 in between.

In summary, the present invention, a bidirectional hydraulic hybrid power system containing an externally connected bidirectional manual pump, eliminates the deficiency of the prior art. By externally connecting the bidirectional manual pump system, the electrohydraulic power system is ready for upgrading to a hybrid-driven system, making the upgrade economical and convenient. Furthermore, the electrical and manual hydraulic power systems share some of the same components to reduce costs in materials and inventory. The manual switching valve fully isolates the bidirectional pump from the manual pump, preventing the system's output pressure and oil supply from instability due to unwanted leaking of pressurized oil. Thus, the operator can easily pedal the manual pump to output hydraulic power efficiently. Therefore, the present invention satisfies the essential requirements for a patent, and as such, a patent application is filed accordingly.

We claim:

1. A bidirectional hydraulic hybrid power system containing an externally connected bidirectional manual pump, comprising:

an oil reservoir that stores hydraulic oil;

a bidirectional pump drawing hydraulic oil from the oil reservoir, which outputs pressurized oil through one of its two output channels according to the pump's rotating directions;

a motor that drives the bidirectional pump to rotate clockwise or counterclockwise;

a two-pressure valve having two ports, wherein it closes the passage between the oil reservoir and the port pushed by pressurized oil meanwhile opens the passage between the oil reservoir and the other port;

an oil circuit block having the above mentioned two-pressure valve integrated within it and connecting the oil reservoir, the bidirectional pump, and the motor, wherein a first motor pump external port and a second motor pump external port are connected respectively to the bidirectional pump's two output channels;

a first oil tube that connects between the first motor pump external port and the first two-pressure valve port; and a second oil tube that connects between the second motor pump external port and the second two-pressure valve port;

an external bidirectional manual pump can be connected to the above said bidirectional electro-hydraulic power system, when necessary, through the two motor pump external ports and the two two-pressure valve ports by replacing or rerouting the first and the second oil tubes, wherein the bidirectional manual pump system comprises a manual pump, a manual switching valve, a manual-pump oil circuit coupled between the manual pump and manual switching valve, an oil inlet tube, a first oil outlet tube, and a second oil outlet, in which the bidirectional manual pump system draws hydraulic oil from the oil reservoir through the oil inlet tube and outputs pressurized oil through one of its two oil outlet tubes that is selected by the manual switching valve to one of the two two-pressure valve ports;

wherein the first and second two-pressure valve ports supply bidirectional hydraulic power to an external hydraulic system.

2. The bidirectional hydraulic hybrid power system containing an externally connected bidirectional manual pump of claim 1, wherein the oil circuit block further comprises two pressure relief valves, each with an inlet connected to one of the two-pressure valve ports and an outlet connected to the oil reservoir.

3. The bidirectional hydraulic hybrid power system containing an externally connected bidirectional manual pump of claim 2, wherein the oil circuit block further comprises an external oil returning port connected to the oil reservoir, which drains the leaking low-pressure oil from the external hydraulic system to the oil reservoir.

4. The bidirectional hydraulic hybrid power system containing an externally connected bidirectional manual pump of claim 1, wherein the manual switching valve comprises a manual selector for selecting one of the three valve positions, the first, second, and third ones.

5. The bidirectional hydraulic hybrid power system containing an externally connected bidirectional manual pump of claim 4, wherein the first valve position of the manual switching valve opens the passage for the output of the pressurized oil from the bidirectional manual pump system to the first two-pressure valve port; the second valve position of the manual switching valve opens the passage for the output of the pressurized oil from the bidirectional manual pump system to the second two-pressure valve port; the third valve position of the manual switching valve opens the passage from the first motor pump external port to the first two-pressure valve port and the passage from the second motor pump external port to the second two-pressure valve port.

6. The bidirectional hydraulic hybrid power system containing an externally connected bidirectional manual pump of claim 5, wherein the manual pump and the manual switching valve are integrated into one structural piece.

7. The bidirectional hydraulic hybrid power system containing an externally connected bidirectional manual pump of claim 5, wherein the manual pump and the manual switching valve are separate structural pieces.

8. The bidirectional hydraulic hybrid power system containing an externally connected bidirectional manual of claim 3, wherein the manual switching valve comprises a manual selector for selecting one of the three valve positions, the first, second, and third ones.

9. The bidirectional hydraulic hybrid power system containing an externally connected bidirectional manual of claim 8, wherein the first valve position of the manual switching valve opens the passage for the output of the pressurized oil from the bidirectional manual pump system to the first two-pressure valve port; the second valve position of the manual switching valve opens the passage for the output of the pressurized oil from the bidirectional manual pump system to the second two-pressure valve port; the third valve position of the manual switching valve opens the passage from the first motor pump external port to the first two-pressure valve port and the passage from the second motor pump external port to the second two-pressure valve port.

10. The bidirectional hydraulic hybrid power system containing an externally connected bidirectional manual of claim 9, wherein the manual pump and the manual switching valve are integrated into one structural piece.

11. The bidirectional hydraulic hybrid power system containing an externally connected bidirectional manual of claim 9, wherein the manual pump and the manual switching valve are separate structural pieces.

* * * * *